United States Patent
Guernsey et al.

(10) Patent No.: US 11,807,461 B2
(45) Date of Patent: Nov. 7, 2023

(54) BELT MODULE AND CONVEYOR BELT WITH STURDY EDGE

(71) Applicant: Laitram, L.L.C., Harahan, LA (US)

(72) Inventors: Kevin W. Guernsey, Destin, FL (US); John E. Wenzel, Madisonville, LA (US); David Aaron van Schalkwijk, Metairie, LA (US); Matthew Vulpetti, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 124 days.

(21) Appl. No.: 17/601,895

(22) PCT Filed: Apr. 3, 2020

(86) PCT No.: PCT/US2020/026683
§ 371 (c)(1),
(2) Date: Oct. 6, 2021

(87) PCT Pub. No.: WO2020/219255
PCT Pub. Date: Oct. 29, 2020

(65) Prior Publication Data
US 2022/0212874 A1    Jul. 7, 2022

Related U.S. Application Data

(60) Provisional application No. 62/837,819, filed on Apr. 24, 2019.

(51) Int. Cl.
*B65G 17/30* (2006.01)
*B65G 17/08* (2006.01)
*B65G 17/40* (2006.01)

(52) U.S. Cl.
CPC ............. *B65G 17/30* (2013.01); *B65G 17/08* (2013.01); *B65G 17/40* (2013.01); *B65G 2207/12* (2013.01); *B65G 2207/30* (2013.01); *B65G 2207/48* (2013.01)

(58) Field of Classification Search
None
See application file for complete search history.

(56) References Cited

U.S. PATENT DOCUMENTS

| | | |
|---|---|---|
| 4,832,187 A | 5/1989 | Lapeyre |
| 4,925,016 A | 5/1990 | Lapeyre |
| 4,934,517 A | 6/1990 | Lapeyre |
| 4,949,838 A | 8/1990 | Lapeyre et al. |
| 4,953,693 A | 9/1990 | Draebel |
| 4,971,191 A | 11/1990 | Lapeyre |
| 4,974,724 A | 12/1990 | Lapeyre |
| 5,105,938 A | 4/1992 | Tan |

(Continued)

FOREIGN PATENT DOCUMENTS

WO    2017062430 A1    4/2017

OTHER PUBLICATIONS

Extended European Search Report, European Patent Application No. 20795282.1, dated May 30, 2023, European Patent Office, Munich, Germany.

*Primary Examiner* — Kavel Singh
(74) *Attorney, Agent, or Firm* — James T. Cronvich

(57) ABSTRACT

Belt edge modules for constructing modular conveyor belts with sturdy outer edges. The edge modules have thickened outer edge regions in module edge portions that are difficult to snip or break off to access hinge rods.

20 Claims, 4 Drawing Sheets

(56) References Cited

U.S. PATENT DOCUMENTS

| | | | |
|---|---|---|---|
| 5,377,819 | A | 1/1995 | Horton et al. |
| 5,507,383 | A | 4/1996 | Lapeyre et al. |
| 5,598,916 | A | 2/1997 | Horton et al. |
| 5,850,902 | A | 12/1998 | Hicks et al. |
| 5,921,379 | A | 7/1999 | Horton |
| 6,345,715 | B2 | 2/2002 | Palmaer |
| 6,814,223 | B1 | 11/2004 | Verdigets et al. |
| 6,859,516 | B2 | 2/2005 | Verdigets |
| 7,073,662 | B2 | 7/2006 | Neely et al. |
| 7,575,113 | B2 | 8/2009 | Sedlacek et al. |
| 7,832,549 | B2 | 11/2010 | Honeycutt |
| 7,980,385 | B2 | 7/2011 | Guernsey |
| 8,464,862 | B2 | 6/2013 | Honeycutt et al. |
| 8,579,104 | B2 | 11/2013 | Weiser et al. |
| 8,776,998 | B2 | 7/2014 | Weiser et al. |
| 8,863,944 | B2 | 10/2014 | MacLachlan |
| 9,254,964 | B2 | 2/2016 | Oertling |
| 9,550,628 | B2 * | 1/2017 | Wunsch ................ B65G 17/08 |
| 2003/0136647 | A1 | 7/2003 | Knott et al. |
| 2010/0258410 | A1 | 10/2010 | Wunsch |
| 2013/0248326 | A1 | 9/2013 | Ruge et al. |

* cited by examiner

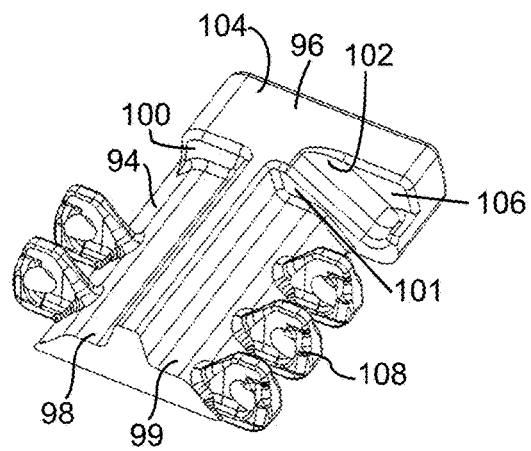 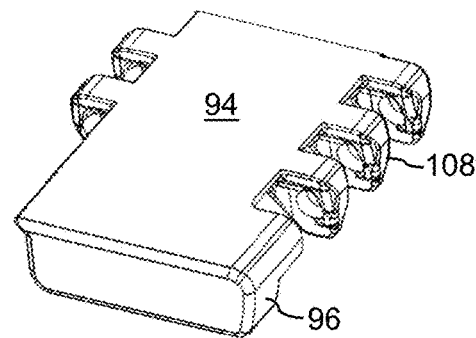
FIG. 5A         FIG. 5B
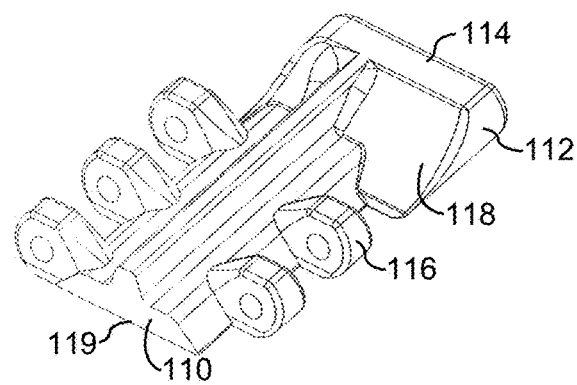 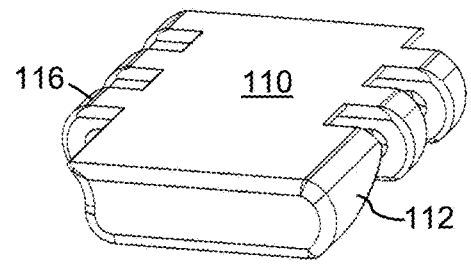
FIG. 6A         FIG. 6B
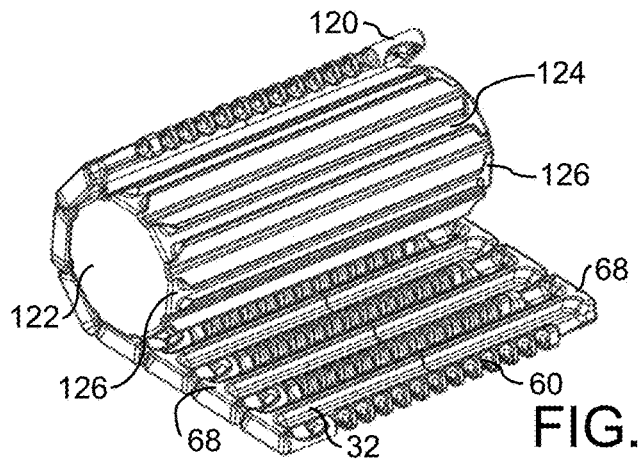
FIG. 7

BELT MODULE AND CONVEYOR BELT WITH STURDY EDGE

BACKGROUND

The invention relates generally to power-driven conveyors. In particular the invention relates to conveyor belt modules joined at hinges to form modular conveyor belts.

Modular plastic conveyor belts are used to convey products. The belts are constructed of rows of plastic belt modules joined by hinge rods at hinge joints. For repair and often for cleaning, a belt has to be partly disassembled for a broken module to be replaced or for the belt to be removed from the conveyor frame for remote cleaning. The first stage in disassembling a modular plastic conveyor belt is the removal of a hinge rod by plant maintenance personnel. When in a hurry or without a proper tool at hand, maintenance personnel may snip or otherwise break off an edge of belt to expose the end of a hinge rod for a better purchase to pull it out of its hinge joint. Once the hinge rod is extracted, the belt can be removed from the conveyor, or broken modules can be replaced. But the broken belt edge loses its effectiveness as a hinge-rod retainer and becomes a potential snag point.

SUMMARY

One version of a conveyor belt module embodying features of the invention comprises a deck extending in length from a first end to a second end, laterally in width from a first side to a second side, and in thickness from a top side to a bottom side. First hinge elements are spaced apart laterally across the width of the deck along the first end, and second hinge elements are spaced apart laterally across the width of the deck along the second end. A rib protrudes from and extends laterally along the bottom side of the deck. The rib divides the bottom side of the deck into a first region forming a first channel between the rib and the first hinge elements and a second region forming a second channel between the rib and the second hinge elements. A module edge portion extends laterally outward from the first side of the deck to an outer edge. The module edge portion includes a top surface forming a continuation of the top side of the deck from the first side out to the outer edge and a bottom surface extending laterally inward from the outer edge short of the first side of the deck. The bottom surface forms with the top surface a thickened outer edge region thicker than the deck.

One version of a conveyor belt embodying features of the invention comprises a series of rows of one or more conveyor belt modules extending laterally in width from a first belt edge to a second belt edge and hingedly connected end to end at hinge joints between consecutive rows. Each of the rows includes a deck that extends in length from a first end to a second end, laterally across the row in width from a first side to a second side, and in thickness from a top side to a bottom side. First hinge elements are spaced apart laterally across the width of the deck along the first end, and second hinge elements are spaced apart laterally across the width of the deck along the second end. A rib protrudes from and extends laterally along the bottom side of the deck. The rib divides the bottom side of the deck into a first region forming a first channel between the rib and the first hinge elements and a second region forming a second channel between the rib and the second hinge elements. A first module edge portion extends laterally outward from the first side of the deck to an outer edge defining the first belt edge, and a second module edge portion extends laterally outward from the second side of the deck to an outer edge defining the second belt edge. Each of the first and second module edge portions includes a top surface forming a continuation of the top side of the deck from the first side out to the outer edge and a bottom surface extending laterally inward from the outer edge short of the deck. The bottom surface forms with the top surface a thickened outer edge region.

One version of a conveyor embodying features of the invention comprises a conveyor belt and a reversing element. The conveyor belt is constructed of a series of rows of one or more conveyor belt modules extending laterally in width from a first belt edge to a second belt edge and hingedly connected end to end at hinge joints between consecutive rows. Each of the rows includes a deck extending in length from a first end to a second end, laterally across the row in width from a first side to a second side, and in thickness from a top side to a bottom side. First hinge elements are spaced apart laterally across the width of the deck along the first end, and second hinge elements are spaced apart laterally across the width of the deck along the second end. A rib protrudes from and extends laterally along the bottom side of the deck. The rib divides the bottom side of the deck into a first region forming a first channel between the rib and the first hinge elements and a second region forming a second channel between the rib and the second hinge elements. A first module edge portion extends laterally outward from the first side of the deck to an outer edge defining the first belt edge, and a second module edge portion extends laterally outward from the second side of the deck to an outer edge defining the second belt edge. Each of the first and second module edge portions includes a top surface forming a continuation of the top side of the deck from the first side out to the outer edge and a bottom surface extending laterally inward from the outer edge short of the deck. The bottom surface forms with the top surface a thickened outer edge region thicker than the deck. The reversing element has a cylindrical periphery with a plurality of lateral grooves sized to receive the ribs and opening up at each end of the lateral grooves to edge recesses sized to receive the bottom surfaces of the thickened outer edge regions. The bottom surfaces are confined in the edge recesses to limit lateral wander of the conveyor belt along the reversing element.

BRIEF DESCRIPTION OF THE DRAWINGS

FIGS. 5A and 5B are top and bottom isometric views of another version of a belt module embodying features of the invention and usable in a belt as in FIG. 4.

FIGS. 6A and 6B are top and bottom isometric views of yet another version of a belt module embodying features of the invention and usable in a belt as in FIG. 4.

FIG. 7 is an isometric view of a full-width reversing element engaged with a conveyor belt constructed of belt modules as in FIG. 2A.

DETAILED DESCRIPTION

Figures 1A, 1B, 1C:
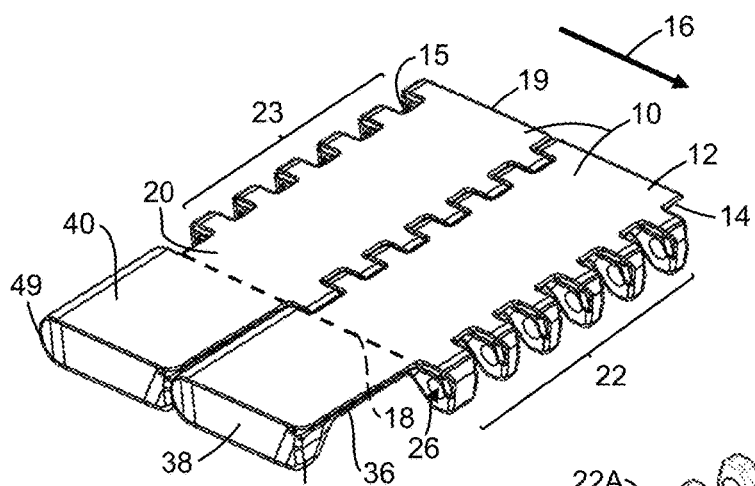
FIGS. 1A-1C are top isometric, bottom isometric, and bottom plan views of one version of two joined conveyor belt modules embodying features of the invention.

One version of conveyor belt modules having sturdy, thickened edges is shown in FIGS. 1A-1C. The modules 10 each have a deck 12 that extends in length from a first end 14 to a second end 15 in a direction of belt travel 16, laterally in width from a first side 18 to a second side 19, and in thickness from a top side 20 to a bottom side 21. First hinge elements 22 are spaced apart laterally across the width of the deck 12 along the first end 14. Second hinge elements 23 are spaced apart laterally across the width of the deck 12 along the second end 15. Gaps 24 between consecutive hinge elements 22, 23 are sized to receive the hinge elements of an adjacent module in an interleaved arrangement in which rod holes 26 extending laterally through the interleaved hinge elements are aligned to form a lateral passageway. The interleaved hinge elements 22, 23 of adjacent modules 10, together with a hinge rod 28 received in the passageway, form a hinge joint 30 connecting the adjacent modules.

One of the first hinge elements 22—the one closest to the first side 18 of the deck 12—is a laterally wider first hinge element 22A serving as an indexing hinge element. A corresponding wide space 24A at the first side 18 and the second end 15 is sized to receive the wide first hinge element 22A of an adjacent module 10. Because the wide hinge element 22A is too wide to fit in the other spaces 24 along the second end 15, the modules 10 can't be mistakenly misaligned during assembly: there is only one way to join them together. The wide hinge element 22A and the wide space 24A could alternatively be formed at other lateral positions along the groups of hinge elements 22, 23 to prevent the modules from being misaligned during assembly.

A rib 32 protruding from the bottom side 21 of the deck 12 extends laterally between the first and second sides 18, 19. The rib 32, which can serve as a drive bar for a drive sprocket or as an impact bar, divides the bottom side 21 of the deck 12 into a first region forming a first channel 34 between itself and the first hinge elements 22 and a second region forming a second channel 35 between itself and the second hinge elements 23.

A module edge portion 36 extends laterally outward from the first side 18 of the deck 12 to an outer edge 38. The edge portion 36 has a top surface 40 that forms a continuation of the top side 20 of the deck 12 out to the outer edge 38. A bottom surface 41 of the edge portion 36 extends laterally inward of the outer edge 38 short of the first side 18 of the deck 12. The bottom surface 41 forms a thickened outer edge region 42 with the top surface 40 and can be made wide enough to serve as a wear pad that slides along a carryway wearstrip. The thickened outer edge region 42 extends through the thickness of the module 10 on the module edge portion 36. A rib continuation 44 on the edge portion 36 extends from the bottom-side rib 32 at the first side 18 of the deck 12 to the bottom surface 41 to form extensions of the first and second channels 34, 35 onto the module edge portion out to the thickened outer edge region 42. The bottom surface 41 of the edge portion 36, the rib continuation 44, and the rib 32 extend to the same level 46 so as to be coplanar in this version. But they could extend to different levels in other versions.

The rib continuation 44 curves away from collinear alignment with the rib 32 to meet the bottom surface 41 at a first edge end 48 of the edge portion 36. The first edge end 48 is aligned with the first end 14 of the deck 12. An opposite second edge end 49 is outwardly offset in the length direction from the second end 15 of the deck 12. An edge hinge element 50 at the second edge end 49 has a rod hole 52 aligned with the rod holes 26 of the second hinge elements 23 along the second end 15 of the deck 12. The end of the hinge rod 28 normally resides between the edge hinge element 50 and the thickened outer edge region 42.

A web 54 extends from the thickened outer edge region 42 inward to the edge hinge element 50. The curved web 54 is continuous with the top surface 40 and extends around the circumference of the edge hinge element 50 to form a nose extending laterally along the second edge end 49 of the module edge portion 36. The web 54 extends circumferentially far enough to provide a guard preventing a finger from being pinched at the hinge joint 30. An inner wall 55 aligned with and facing the second hinge elements 23 and the edge hinge element 50 forms a stop for the hinge rod 28.

The end of the extension of the second channel 35 opens into a broader terminal space, a lacuna 56, bounded by the rib continuation 44, the thickened outer region 42, and the web 54. Cleaning fluid or water sprayed onto the bottom side of a conveyor belt in the belt return advances along the second channel 35 and into the lacuna 56, which exposes the edge hinge element 50, the inner side of the web 54, and the end of the hinge rod 28 to the cleaning fluid as indicated by the arrow 58. Cleaning fluid or water is guided by the first channel 34 to the first edge end 48 to clean between the edge portions 36 of adjacent modules 12, as indicated by the arrow 59.

The flat bottom surface 41 extends inward of the outer edge 38 to a ramp 57 that slopes further inward to the bed of the lacuna 56. The curved ramp 57, which forms an inner wall bounding the lacuna 54, prevents a pliers from getting a good purchase on the module edge portion 36 and snapping it off.

Figure 2A:
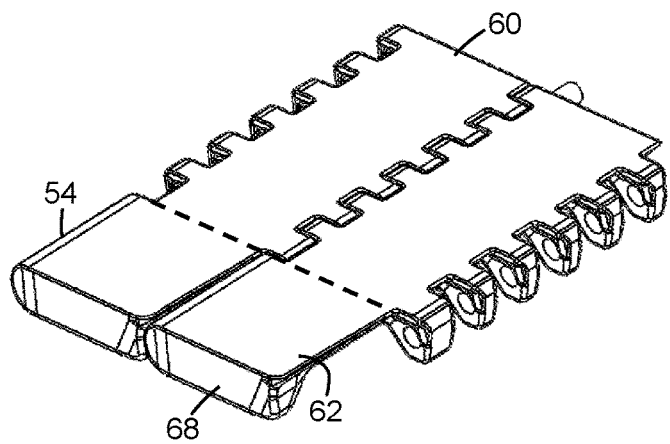
FIGS. 2A-2C are top isometric, bottom isometric, and bottom plan views of another version of two joined conveyor belt modules embodying features of the invention.
Figure 2B:
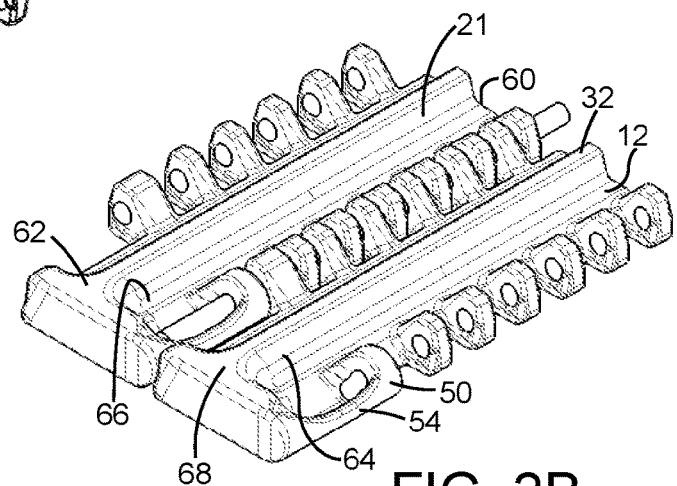
Figure 2C:
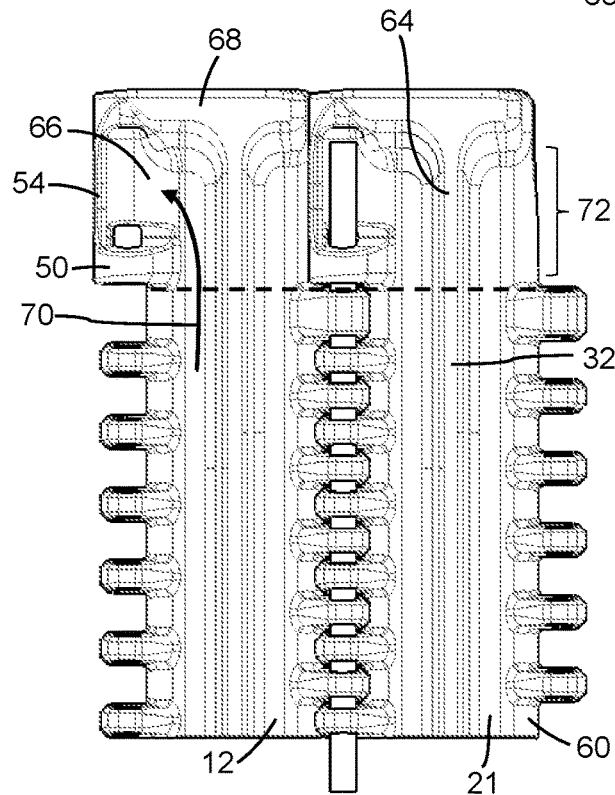

Another version of conveyor belt modules is shown in FIGS. 2A-2C. The modules 60 are similar to those in FIGS. 1A-1C, except that module edge portions 62 have a linear rib continuation 64 that is collinear with the rib 32 on the bottom side 21 of the deck 12. Because the rib continuation 64 does not curve away from collinear alignment with the rib 32, a lacuna 66 bounded by the rib continuation 64, a thickened outer edge portion 68, and the inner side of the web 54 is smaller than the lacuna shown in FIGS. 1B and 1C, but broader than the extended second channel 35. The extended second channel 35 opens into the lacuna 66 to guide cleaning fluid or water to the back of the web 54 and the edge hinge element 50 as indicated by the arrow 70. The collinear rib continuation 64 provides a longer exposed area 72 at the first edge end 48 of the module edge portion 62.

Figure 3:
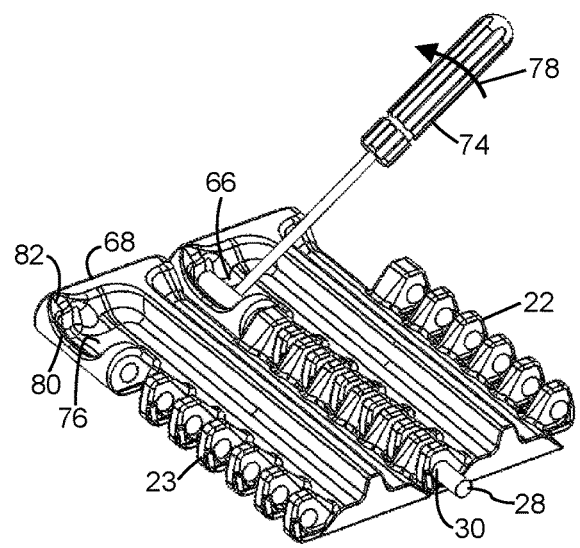
FIG. 3 is a bottom isometric view of the belt modules of FIGS. 2A-2C showing hinge rod removal by screwdriver.

As shown in FIG. 3, the hinge rod 28 can be easily removed from the hinge joint 30 with a removal tool, such as a screwdriver 74. If a screwdriver is used the flat of the screwdriver 74 is inserted between the end of the hinge rod and the bed 76 of the lacuna 66. Then the screwdriver 74 is rotated about 90°, as indicated by the arrow 78, to lift the end of the hinge rod 28 away from the bed 76 and up an inner wall 80 of the thickened outer edge portion 68. The lifted end of the hinge rod 28 can then be grasped by a pliers or the fingers and pulled from the hinge joint 30 to disconnect the belt rows.

The rows are reconnected by first interleaving their first and second hinge elements 22, 23 into alignment. Then the end portion of the hinge rod 28 is bent and slid along a depression 82 in the outer edge portion 68 and into the rod hole in the edge hinge element 50. The hinge rod 28 is then pushed through the lateral passageway formed by the interleaved hinge elements 22, 23 to rejoin the two adjacent belt rows.

Figure 4:
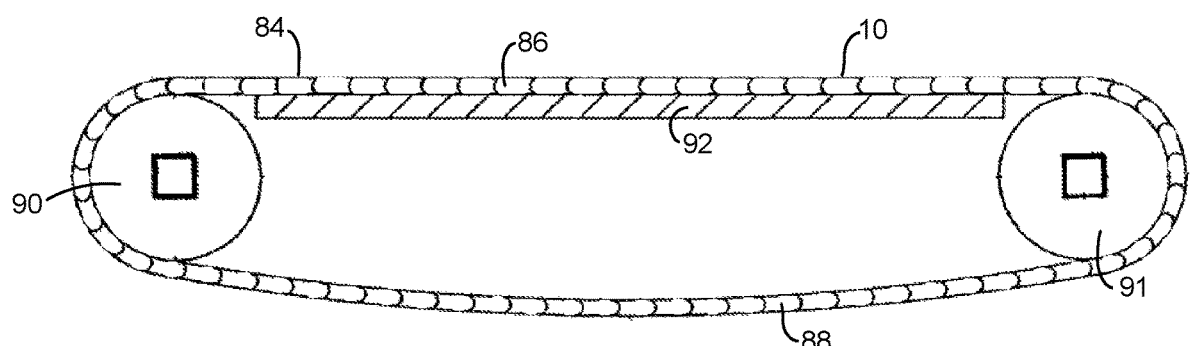
FIG. 4 is a side elevation view of a conveyor belt constructed of modules as in FIG. 1A or FIG. 2A.

A modular conveyor belt 84 constructed of rows 86 of belt modules 10 (FIGS. 1A-1C) or belt modules 60 (FIGS. 2A-2C) is shown in FIG. 4. The rows 86 include one or more belt modules, including edge modules 10 (or 60) at the opposite outer edges 88 of the belt 84 and interior belt modules like the edge modules 10 (or 60), but without the module edge portion 38 (or 68). Such a modular belt with multiple modules per row 86 is typically arranged with the modules in a bricklay pattern to avoid continuous seams along the length of the belt. And the deck in each row of multiple modules is still considered to be continuous despite the narrow seams between abutting, laterally adjacent modules. Belt modules with module edge portions 38 (or 68) at both sides can be used to construct seamless belt rows consisting of only one belt module per row. In those belt modules the module edge portions 38 (or 68) are arranged with their edge hinge elements at opposite ends of the module for reversibility. The conveyor belt 84 is trained around drive and idle sprockets 90, 91 and supported along an upper carryway by wear strips 92 on which at least the bottom surfaces of the outer edge portions of the belt edge modules slide. The belt 84 returns from the drive sprocket 90 to the idle sprocket 91 in a lower return.

Another version of a belt edge module usable in a conveyor belt as in FIG. 4 is shown in FIGS. 5A and 5B. The belt module 94 differs from the modules 10, 60 of FIGS. 1A-1C and FIGS. 2A-2C in that it does not have a lacuna into which one of its channels 98, 99 opens and it does not have an enlarged indexing hinge element. The channels terminate at a thickened outer edge region 96 forming an outer edge portion of the module. A slot 102 extends at an angle from the module's bottom surface 104 along an inner wall 106. The slot 102 provides access for a rod-removal tool to bend the end of the hinge rod toward the bottom surface so that it can be grasped and removed. The inner wall 106, which presents a stop that is in line with and faces a line of hinge elements 108, prevents the hinge rod from working its way out of the line of interleaved hinge elements during operation of the belt. Because the lateral extent and the area of the bottom surface of the thickened outer region 96 are greater than those of the hinge elements 108, the bottom surface can serve as a wear pad that rides on a carryway wearstrip.

Yet another version of an edge module 110 with a thickened outer region 112 and usable in a conveyor belt as in FIG. 4 is shown in FIGS. 6A and 6B. The bottom surface 114 of the thickened outer region 112 has a lateral extent and an area greater than those of the hinge elements 116 to make it effective as a wear pad. A ramp 118, which may be concavely curved as in FIG. 6A, flat, or concavely piecewise flat, extends from the bottom surface 114 toward the deck 119. The ramp 118 is in line with and faces the hinge elements 116 along one end of the module. The ramp 118 provides a slide surface along which the end of a hinge rod can slide when pushed out through the hinge elements 116 during manual removal.

FIG. 7 shows a portion of a conveyor belt 120 constructed of the belt modules 60 shown in FIG. 2A. The belt 120 is shown engaged by a reversing element 122, such as a full-width drive or idle sprocket or drum around which the belt reverses direction from an upper carryway to a lower return. The full-width reversing element 122 is typically mounted in a fixed lateral position relative to a conventional conveyor frame (not shown). The outer cylindrical periphery of the reversing element 122 has circumferentially spaced lateral grooves 124 across its width sized to receive the belt ribs 32. At opposite sides of the reversing element 122, the grooves open at their ends into edge recesses 126 sized to receive the bottom surfaces of the thickened outer edge portions 68 of the belt modules 60. In this version the shape of the grooves 124 and the edge recesses 126 is complementary to the shape of the modules' outer edge portions 68 and ribs 32. The bottom surfaces of the thickened outer edge portions 68 of the belt 120 are confined in the edge recesses 126 to limit the lateral wander of the belt along the reversing element 122. In that way the reversing element 122 keeps the belt 120 on track in the conveyor frame.

Although the invention has be described in detail with respect to a few illustrative versions used to describe features of the invention, other versions are possible. For example, the lateral ribs or drive bars on the bottoms of the belt modules are shown as continuous and joining the thickened outer edge portions in all the versions. But the ribs could be divided into segments across gaps or could be separated from the thickened outer edge portions by gaps. And complementary reversing-element peripheries that mate with the bottoms of belt modules other than those in FIG. 7, such as the other modules described in detail, could be made to make a conveyor with full-width reversing elements that track a conveyor belt.

What is claimed is:

1. A conveyor belt module comprising:
   a deck extending in length from a first end to a second end, laterally in width from a first side to a second side, and in thickness from a top side to a bottom side;
   a plurality of first hinge elements spaced apart laterally across the width of the deck along the first end;
   a plurality of second hinge elements spaced apart laterally across the width of the deck along the second end;
   a rib protruding from and extending laterally along the bottom side of the deck;
   wherein the rib divides the bottom side of the deck into a first region forming a first channel between the rib and the first hinge elements and a second region forming a second channel between the rib and the second hinge elements;
   a module edge portion extending in length from a first edge end aligned with the first end of the deck to a second edge end outwardly offset in length from the second end of the deck and extending laterally outward from the first side of the deck to an outer edge and including:
      a top surface forming a continuation of the top side of the deck from the first side out to the outer edge;
      a bottom surface extending laterally inward from the outer edge short of the first side of the deck; and
      wherein the bottom surface forms with the top surface a thickened outer edge region thicker than the deck;
   a rib continuation extending from the rib at the first side of the deck to the bottom surface to form extensions of the first and second channels onto the module edge portion out to the bottom surface and wherein the bottom surface is continuous with the rib continuation;
   wherein the extension of the second channel in the module edge portion opens into a lacuna bounded by the thickened outer edge region, the rib continuation, and the second edge end.

2. A conveyor belt module as claimed in claim 1 wherein the rib continuation is collinear with the rib.

3. A conveyor belt module as claimed in claim 1 wherein the rib continuation curves away from collinear alignment with the rib to meet the bottom surface.

4. A conveyor belt module as claimed in claim 1 wherein the rib continuation meets the bottom surface of the module edge portion at the first edge end.

5. A conveyor belt module as claimed in claim 4 wherein the module edge portion includes an edge hinge element at the second edge end aligned with the second hinge elements along the second end of the deck.

6. A conveyor belt module as claimed in claim 5 wherein the module edge portion includes a web extending from the thickened outer edge region to the edge hinge element and continuous with the top surface at the second edge end to form with the thickened outer edge region and the rib continuation a lacuna into which the extension of the second channel opens.

7. A conveyor belt module as claimed in claim 1 wherein the bottom surface, the rib continuation, and the rib extend from the deck to the same level.

8. A conveyor belt module as claimed in claim 1 comprising a second edge module portion extending laterally outward from the second side of the deck.

9. A conveyor belt module as claimed in claim 1 wherein the thickened outer edge region is wider than the first hinge elements.

10. A conveyor belt module as claimed in claim 1 wherein the first hinge element at the first side of the deck is laterally wider than the other first hinge elements.

11. A conveyor belt module as claimed in claim 1 wherein the module edge portion includes a ramp extending from the bottom side of the deck at the first side of the deck to the bottom surface of the module edge portion.

12. A conveyor belt module as claimed in claim 1 wherein the module edge portion includes an inner wall aligned with and facing the first hinge elements.

13. A conveyor belt module as claimed in claim 12 wherein the inner wall is a ramp extending from the bottom surface.

14. A conveyor belt comprising:
a series of rows of one or more conveyor belt modules extending laterally in width from a first belt edge to a second belt edge and hingedly connected end to end at hinge joints between consecutive rows, wherein each of the rows includes:
a deck extending in length from a first end to a second end, laterally across the row in width from a first side to a second side, and in thickness from a top side to a bottom side;
a plurality of first hinge elements spaced apart laterally across the width of the deck along the first end;
a plurality of second hinge elements spaced apart laterally across the width of the deck along the second end;
a rib protruding from and extending laterally along the bottom side of the deck;
wherein the rib divides the bottom side of the deck into a first region forming a first channel between the rib and the first hinge elements and a second region forming a second channel between the rib and the second hinge elements;
a first module edge portion extending laterally outward from the first side of the deck to an outer edge defining the first belt edge and a second module edge portion extending laterally outward from the second side of the deck to an outer edge defining the second belt edge, wherein each of the first and second module edge portions includes:
a top surface forming a continuation of the top side of the deck from the first side out to the outer edge;
a bottom surface extending laterally inward from the outer edge short of the deck;
wherein the bottom surface forms with the top surface a thickened outer edge region;
wherein each of the first and second module edge portions includes a rib continuation extending from the rib on the deck to the bottom surface to form extensions of the first and second channels onto the module edge portion out to the bottom surface and wherein the bottom surface is continuous with the rib continuation; and
wherein the first module edge portion extends in length from a first edge end aligned with the first end of the deck to a second edge end outwardly offset in length from the second end of the deck and wherein the second module edge portion extends in length from a first edge end aligned with the second end of the deck to a second edge end outwardly offset in length from the first end of the deck.

15. A conveyor belt as claimed in claim 14 wherein each of the rows includes two or more conveyor belt modules forming the deck separated by seams between abutting conveyor belt modules.

16. A conveyor belt as claimed in claim 14 wherein the first module edge portion is formed on a first conveyor belt module at the first belt edge and the second module edge portion is formed on a second conveyor belt module at the second belt edge.

17. A conveyor belt as claimed in claim 14 wherein the first module edge portion includes a first lacuna into which the second channel opens, wherein the first lacuna is bounded by the thickened outer edge region, the rib continuation, and the second edge end of the first module edge portion, and wherein the second module edge portion includes a second lacuna into which the first channel opens, wherein the second lacuna is bounded by the thickened outer edge region, the rib continuation, and the first edge end of the second module edge portion.

18. A conveyor belt as claimed in claim 17 comprising hinge rods extending through the interleaved first and second hinge elements of consecutive rows at the hinge joints wherein the ends of the hinge rods reside in the first and second lacunae.

19. A conveyor belt as claimed in claim 14 wherein the first module edge portion includes a first edge hinge element at the second edge end aligned with the second hinge elements and wherein the second module edge portion includes a second edge hinge element at the first edge end aligned with the first hinge elements.

20. A conveyor comprising:
a conveyor belt including:
a series of rows of one or more conveyor belt modules extending laterally in width from a first belt edge to a second belt edge and hingedly connected end to end at hinge joints between consecutive rows, wherein each of the rows includes:
a deck extending in length from a first end to a second end, laterally across the row in width from a first side to a second side, and in thickness from a top side to a bottom side;
a plurality of first hinge elements spaced apart laterally across the width of the deck along the first end;
a plurality of second hinge elements spaced apart laterally across the width of the deck along the second end;
a rib protruding from and extending laterally along the bottom side of the deck;

wherein the rib divides the bottom side of the deck into a first region forming a first channel between the rib and the first hinge elements and a second region forming a second channel between the rib and the second hinge elements;

a first module edge portion extending laterally outward from the first side of the deck to an outer edge defining the first belt edge and a second module edge portion extending laterally outward from the second side of the deck to an outer edge defining the second belt edge, wherein each of the first and second module edge portions includes:

a top surface forming a continuation of the top side of the deck from the first side out to the outer edge;

a bottom surface extending laterally inward from the outer edge short of the deck; and wherein the bottom surface forms with the top surface a thickened outer edge region thicker than the deck;

a reversing element having a cylindrical periphery including a plurality of lateral grooves sized to receive the ribs and opening up at each end of the lateral grooves to edge recesses sized to receive the bottom surfaces of the thickened outer edge regions, wherein the bottom surfaces are confined in the edge recesses to limit lateral wander of the conveyor belt along the reversing element.

* * * * *